US009320265B2

(12) United States Patent
Anderson

(10) Patent No.: US 9,320,265 B2
(45) Date of Patent: Apr. 26, 2016

(54) BEE FEEDERS AND BEE FEEDING SYSTEMS FOR BEE COLONIES

(71) Applicant: John Anderson, Columbia, NJ (US)

(72) Inventor: John Anderson, Columbia, NJ (US)

( * ) Notice: Subject to any disclaimer, the term of this patent is extended or adjusted under 35 U.S.C. 154(b) by 74 days.

(21) Appl. No.: 14/261,690

(22) Filed: Apr. 25, 2014

(65) Prior Publication Data

US 2014/0323015 A1 Oct. 30, 2014

Related U.S. Application Data

(60) Provisional application No. 61/816,035, filed on Apr. 25, 2013.

(51) Int. Cl.
*A01K 53/00* (2006.01)

(52) U.S. Cl.
CPC ...................... *A01K 53/00* (2013.01)

(58) Field of Classification Search
CPC ...... A01K 53/00; A01G 9/247; A01G 27/005
USPC ............................... 449/6, 9, 11, 48
IPC ........................ A01K 53/00; A01G 9/24, 27/00
See application file for complete search history.

(56) References Cited

U.S. PATENT DOCUMENTS

| 1,251,583 | A | * | 1/1918 | Saunders | A01K 53/00 119/53 |
| 2,193,741 | A | * | 3/1940 | Roberts, Jr. | A01K 53/00 449/11 |
| 2,611,140 | A | * | 9/1952 | Goble | A01K 53/00 119/77 |
| 4,322,862 | A | * | 4/1982 | Beuthling | A01K 53/00 449/48 |

FOREIGN PATENT DOCUMENTS

GB        1162188   * 8/1969   ........... A01G 27/005

* cited by examiner

*Primary Examiner* — Lisa Tsang
(74) *Attorney, Agent, or Firm* — Doherty IP Law Group LLC

(57) ABSTRACT

A bee feeder system includes a bee house having a plurality of levels. One of the levels includes a bee feeder having a frame with a top major surface and a bottom major surface. The frame surrounds a central opening and a feeder pipe extends across the central opening. The feeder pipe has a distal section that includes feeder holes. A divider covers the central opening. The feeder pipe has a proximal section that extends outside the frame. A feed container is attached to the proximal section of the feeder pipe. The feeder pipe is rotatable relative to the frame for moving between an ON position in which the feeder holes face toward the bottom major face of the frame and an OFF position in which the feeder holes face toward the top major face of the frame.

20 Claims, 8 Drawing Sheets

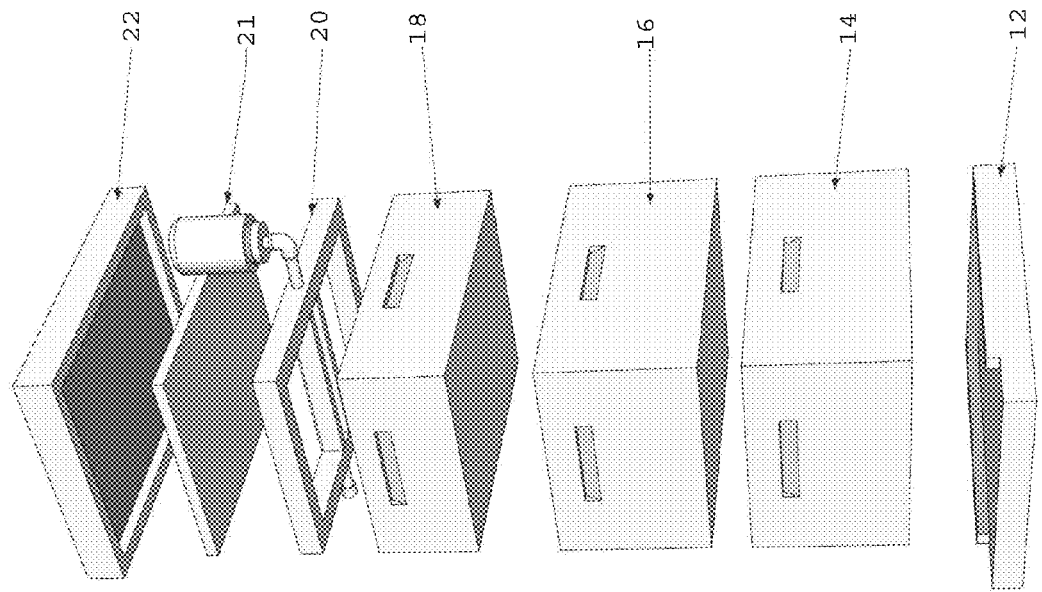
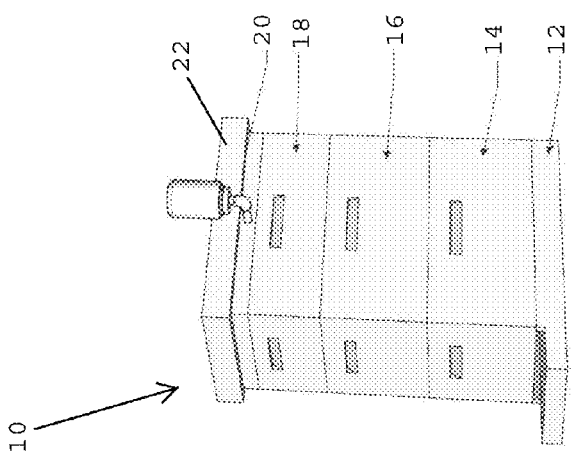

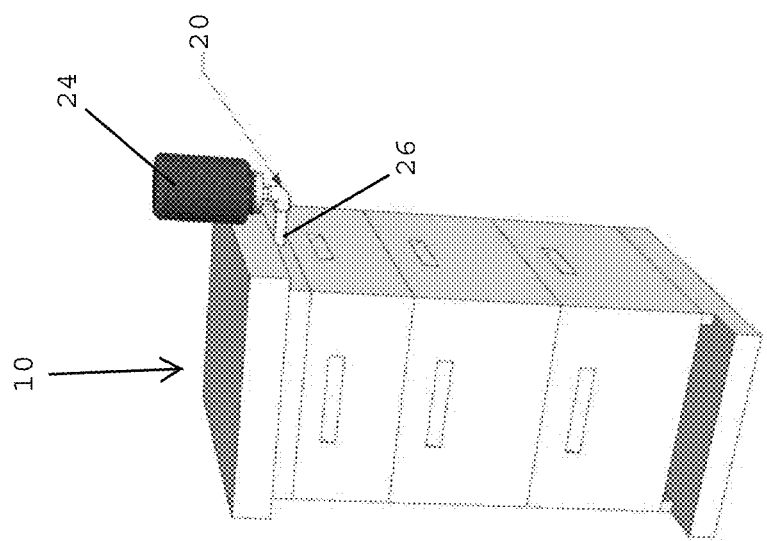
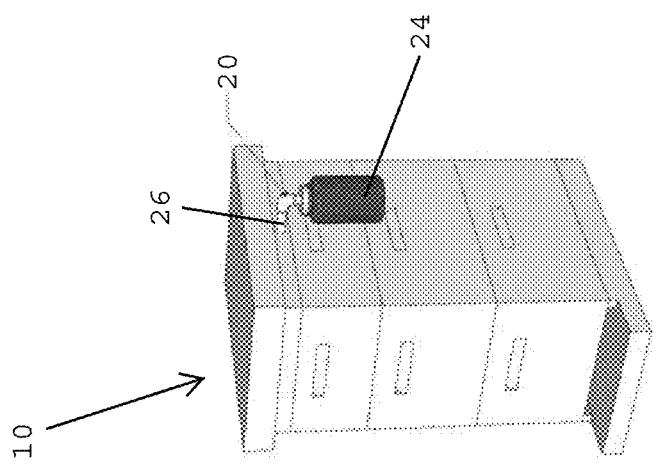
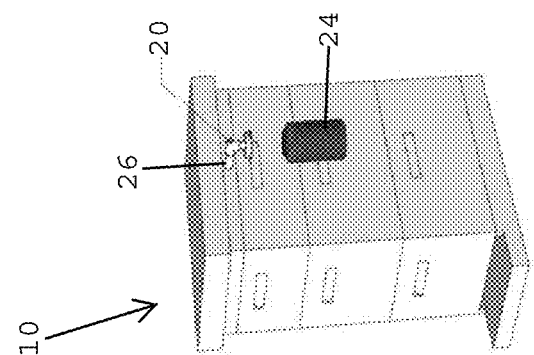
FIG. 3C
FIG. 3B
FIG. 3A

BEE FEEDERS AND BEE FEEDING SYSTEMS FOR BEE COLONIES

CROSS-REFERENCE TO RELATED APPLICATIONS

The present application claims benefit of U.S. Provisional Application Ser. No. 61/816,035, filed Mar. 25, 2014, the disclosure of which is hereby incorporated by reference herein.

BACKGROUND OF THE INVENTION

1. Field of the Invention

The present application is generally related to bees, and is more specifically related to bee feeders and bee feeding systems used for feeding bee colonies.

2. Description of the Related Art

In many instances, it is desirable and frequently necessary for beekeepers to provide supplemental feed to their bee colonies. The supplemental feed typically comprises sugar syrup or other similar viscous feeds.

Depending upon the season and the circumstances, beekeepers may feed their bees for a variety of reasons. Typical situations when feed is provided to a colony include: 1) feeding in early spring, to stimulate brood rearing when colony populations are low and it would be advantageous to build-up the bee population before the honey flow; 2) feeding in the fall, to support the colony as it prepares to winter over; 3) feeding during a dearth, when other food sources are not available; and/or 4) feeding in late winter, to prevent starvation when food stores within the hive have been depleted. There may be other reasons for feeding bees, as well.

In general, bee feeders administer syrup to bees with varying degrees of ease and success. Like other bee feeders, the bee feeder and bee feeder systems disclosed herein allow bees to be fed when needed, however, it provides important advantages over other designs.

Bee feeders generally fall into one of two broad categories, which is based on where the feeder is stationed in relation to the hive.

Feeders installed inside the hive are commonly referred to as internal feeders because the syrup reservoir and feed access are both located within the hive itself.

Feeders installed outside the hive, or at the hive entrance, are commonly referred to as external feeders because the syrup reservoir and the feed access are both located outside the hive or at the hive entrance.

Each of the internal and external bee feeders has specific advantages and related disadvantages. Understanding the unique advantages and disadvantages of conventional bee feeders will facilitate highlighting the innovations and benefits of the inventive bee feeder disclosed herein.

Feeders installed inside the hive generally allow good access for bees to utilize the feed and to protect against robbing. However, monitoring the feeder requires the beekeeper to enter the hive and is therefore disruptive to the house bees and cumbersome for the beekeeper. Moreover, most models drown bees or drench bees, killing or soaking and chilling them.

Feeders installed outside the hive give the beekeeper great access to monitor and refill the feeder, but often create some undesirable issues for the bees themselves. Most significantly, external feeders are not selective and cannot control which bees are administered the food, so they tend to incite disturbances in the home colony's bee population by attracting bees from other hives to fight for the food, called "robbing." Because the feed source is located outside the hive, or accessible at the entrance of the hive, defending the food can take a toll on the home colony. Also, external feeders require that the bees have broken their cluster to feed. Some designs even require the bees to be flying to access the feed, which requires the weather to be above 58 degrees Fahrenheit before the feeder can be utilized.

Within each general category, there are many different styles, makers, and models of feeders. Some of the bee feeders are common enough to be well-known by name. Below is a brief description of the most common bee feeder designs, with a list of advantages and disadvantages associated with each.

Internal Feeders are place inside the hive, most often in an inverted container over the hole in the inner cover, or some other style of reservoir placed on top of the hive. Internal feeders may also comprise frame-like chamber that are filled with syrup that replaces a frame or comb in one of the hive boxes. All internal feeders have a syrup reservoir located inside the hive, which feeds the bees inside the hive. Beekeepers must enter the hive to monitor the feed and to refill it or remove the feeder to inspect the hive.

Advantages of internal feeders includes that the bees get easy access and do not need to be flying to feed. In addition, the feeder is easy to defend and protect because foreign bees do not have direct or easy access to the feed because it is located deep inside the hive.

Disadvantages include the fact that internal feeders tend to drown bees—even when floats or other safeguards are used. They often leak at the seal, especially if used in fluctuating temperatures (warm days with cold nights). The reservoir is messy to handle unless completely empty, making hive inspection awkward. They also tend to introduce extra moisture into the hive, which is undesirable. In addition, beekeepers must go inside the hive to refill or monitor the feed, which takes additional time and usually requires the beekeeper to suit up.

Hive top feeders are internal feeders placed above the bee colony, inside the hive, and are typically used with an entrance reducer and floats. Depending upon the design of the feeder, which can range from an inverted bucket with perforations in the lid to an open well of syrup that sits in the hive, these types of feeders can be messy or difficult for a beekeeper to work with. Common, well-known models include those sold under the names the "Miller Feeder", the "Pail Feeder", and the homemade "Baggie Feeder."

Frame feeders are internal feeders that are inserted into the hive in place of one of the frames of comb. Frame feeders have a tendency to drown bees and so are often used with a float and/or textured walls to minimize losses. Frame feeders can be messy to handle and refill. Common, well-known models include those sold under the names "Division Board Feeders" and the "Candibox."

External feeders keep both the syrup reservoir and the bee access to syrup outside the hive, or at the entrance of the hive. Advantages of external feeders include the fact that beekeepers can easily monitor the feed and refill the feeders. Mess and excess moisture is kept outside the hive.

Disadvantages of external feeders include that some designs make the bees fly across the yard to access the syrup. Other models keep the feed at the entrance, where it can be accessed by any bee in the area—along with the home colony. Regardless of their placement, external feeders require the bees to be moving around and break their cluster to feed. External feeders also incite robbing.

Entrance feeders are a type of external feeder that usually includes a plastic container or a glass jar situated lid-side down in a tray at the entrance of the hive into which syrup slowly drips. This style feeder does not drown many bees, but the design encourages fighting and robbing behavior. Entrance feeders provide easy access to foreign bees and are hard for the home colony to defend. Common, well-known models include the "Bordman Feeder," which comes as "standard issue" with most beginner beekeeping kits. The "Bordman Feeder" has an inverted mason jar situated at the entrance of the hive with a slip-in tray that holds the jar and allows the syrup to drip out.

Distance feeders come in a variety of shapes and sizes. These feeders are situated outside and far away from the hive. Bees are required to fly to the feeding station to access the feeder and feed. Distance feeders require the daytime temperature to be above 60 degrees Fahrenheit to be utilized.

In view of the above-noted deficiencies in conventional bee feeding systems, there remains a need for improved bee feeders and bee feeding systems for bee colonies.

SUMMARY OF THE INVENTION

In one embodiment of the present invention, a bee feeder system preferably includes a frame, such as a wood or plastic frame, having a top major surface and a bottom major surface, the frame surrounding a central opening that extends from the top major surface to the bottom major surface. The bee feeder preferably includes a feeder pipe extending across the central opening of the frame, the feeder pipe having a distal section that includes feeder holes formed on one side of the feeder pipe. The feeder pipe desirably has a proximal section that extends outside the frame. A feed container, such as a feed jar containing bee food, is preferably attachable to the proximal section of the feeder pipe for supplying the bee feed to the feeder pipe. The feeder pipe is rotatable relative to the frame for moving between an ON position in which the feeder holes face toward the bottom major face of the frame and an OFF position in which the feeder holes face toward the top major face of the frame.

In the ON position, the feed container is inverted so that the bee food in the feed container may flow into the distal section of the feeder pipe and drip through the holes for providing the feed to bees. In the OFF position, the feed container is returned to an upright position and the holes in the fed pipe are turned upward so that the feed cannot drip through the holes. In the OFF position, because the feed container is in an upright position, the feed container may be removed from attachment to the proximal end of the feeder pipe without spilling the feed.

In one embodiment, the proximal section of the feeder pipe preferably has an elbow, and the feed container is attached to a proximal end of the elbow. In one embodiment, the proximal end of the elbow desirably has threads that engage opposing threads on the feed container. In one embodiment, the proximal end of the feed pipe preferably has a support flange extending outwardly from the proximal end of the elbow for supporting the feed container when the feeder pipe is in the ON position.

In one embodiment, the feed container is inverted and is located above the distal section of the feeder pipe when the feeder pipe is in the ON position and the feed container is upright and is located below the distal section of the feeder pipe when the feeder pipe is in the OFF position.

In one embodiment, the distal section of the feeder pipe desirably extends along a longitudinal axis, and the feeder holes include a plurality of holes formed in one side of the feeder pipe that are spaced from one another along the longitudinal axis of the distal section of the feeder pipe. In one embodiment, the distal section of the feeder pipe lies between the top and bottom major surfaces of the frame.

In one embodiment, a first opening is formed in a first side wall of the frame, and a second opening is formed in a second side wall of the frame that opposes the first side wall, whereby the first and second openings in the frame are aligned with one another. In one embodiment, a distal section of the feeder pipe preferably passes through the first and second aligned openings. The distal section of the feeder pipe is preferably free to rotate about the longitudinal axis and relative to the first and second aligned openings formed in the opposing first and second side walls.

In one embodiment, the bee feeder desirably includes a feeder pipe housing that surrounds at least two sides of the distal section of the feeder pipe. In one embodiment, the feeder pipe housing preferably has a first slat located on a first side of the distal section of the feeder pipe, which extends between the opposing first and second side walls of the frame, and a second slat located on a second side of the distal section of the feeder pipe, which extends between the opposing first and second side walls of the frame. In one embodiment, the feeder pipe housing preferably includes a top slat extending between upper ends of the first and second slats for covering a top side of the distal section of the feeder pipe. The top slat of the feeder pipe housing desirably lies in a plane that is parallel with the top major surface of the frame.

In one embodiment, a divider, such as a screen or a mesh, preferably covers the central opening of the frame for separating the top major surface of the frame from the bottom major surface of the frame.

In one embodiment, a bee feeder system preferably includes a bee house having a plurality of levels stacked atop one another. In one embodiment, one of the levels of the bee house desirably includes a bee feeder. In one embodiment, the bee feeder preferably includes a frame having a top major surface and a bottom major surface, the frame surrounding a central opening that extends from the top major surface to the bottom major surface, a feeder pipe extending across the central opening of the frame, the feeder pipe having a distal section that extends along a longitudinal axis and that includes feeder holes formed in the feeder pipe, and a divider, such as a screen or mesh, covering the central opening for separating the top major surface of the frame from the bottom major surface of the frame and the distal section of the feeder pipe.

In one embodiment, the feeder pipe preferably has a proximal section that extends outside the frame, and a feed container is attachable to the proximal section of the feeder pipe for supplying feed to the distal section of the feeder pipe. The feeder pipe is preferably rotatable relative to the frame for moving between an ON position in which the feeder holes face toward the bottom major surface of the frame and an OFF position in which the feeder holes face toward the top major surface of the frame.

In one embodiment, the divider may include a feeder pipe housing that surrounds at least two sides of the distal section of the feeder pipe, the feeder pipe housing including a first slat located on a first side of the distal section of the feeder pipe and extending between opposing first and second walls of the frame, a second slat located on a second side of the distal section of the feeder pipe and extending between the opposing first and second walls of the frame, and a top slat extending between upper ends of the first and second slats and the opposing first and second walls of the frame for covering a top side of the distal section of the feeder pipe. In one embodiment, the top slat of the feeder pipe housing preferably lies in a plane that is parallel with the top major surface of the frame.

In one embodiment, the bee feeder is stackable at any of the levels of the bee house. For example, the bee feeder may be stacked between a first deep super and a second deep super, and then later moved up to a location between a second deep super and a shallow super.

These and other preferred embodiments of the present invention will be described in more detail below.

BRIEF DESCRIPTION OF THE DRAWINGS

FIG. 1 shows a bee house having a bee feeder, in accordance with one embodiment of the present invention.

FIG. 2 shows an exploded view of the bee house and bee feeder shown in FIG. 1.

FIG. 3A shows the bee house of FIGS. 1 and 2 with a feed jar removed from the bee feeder, in accordance with one embodiment of the present invention.

FIG. 3B shows the bee feeder of FIG. 3A rotated to the off position.

FIG. 3C shows the bee feeder of FIG. 3A rotated to the on position.

DETAILED DESCRIPTION

Figure 4A:
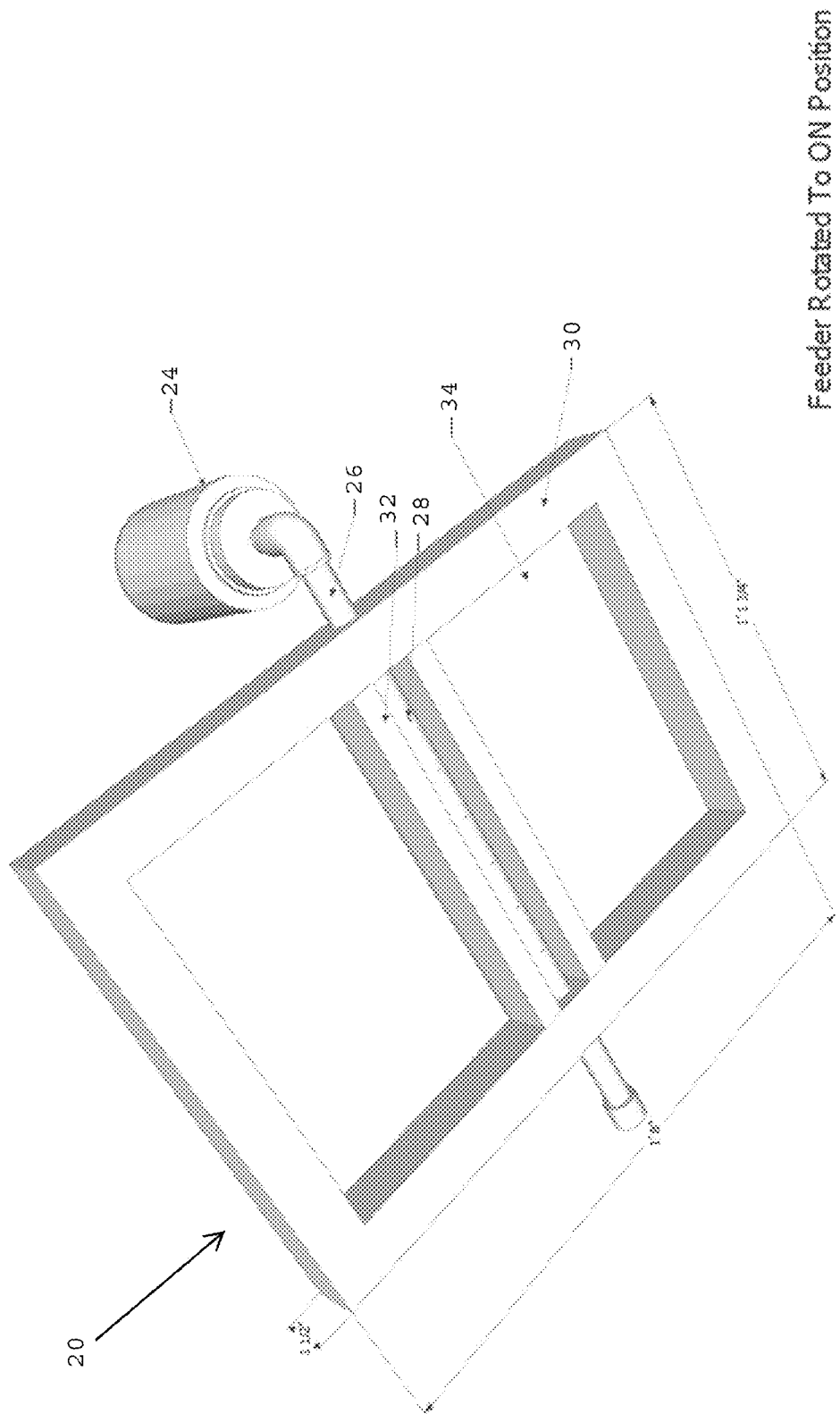
FIG. 4A shows a bottom perspective view of a bee feeder with the feed jar rotated into an on position for feeding bees.

In one embodiment of the present invention, a bee feeder provides significant improvements over conventional bee feeder designs because it blends the best features of both internal and external feeding systems. Although the present invention is not limited by any particular theory of operation, it is believed that a superior bee feeder design is provided because the feed reservoir is located outside the hive, but the feeding of the bees takes place deep inside the hive.

In one embodiment, the bee feeder allows bees the same easy access to syrup inside the hive as an internal feeder, but because the feed reservoir is located outside the hive, it provides the beekeeper direct access to the feeder as well—a convenience previously found only in external feeder designs.

In one embodiment, a perforated pipe runs through and is held in place by a 2" spacer/stage that deploys the feed inside the hive. This innovative design allows the feeder to be slipped in between two hive boxes, anywhere in the hive. In one embodiment, the stage that holds the feeder is preferably positioned just above the upper brood chamber, or above and within reach of the winter cluster. The feeder may be left in place regardless of whether active feeding is taking place, or only sporadic feeding is happening, as weather permits. In one embodiment, in order to feed, an operator may simply remove the jar of syrup and replace it when conditions are right.

Referring to FIGS. 1 and 2, in one embodiment, a bee house 10 includes a base 12, a first deep super 14, a second deep super 16, a shallow super 18, a bee feeder 20, an inner board 21 (FIG. 2), and an outer cover lid 22.

Referring to FIG. 3A, in one embodiment, a feed jar 24 having bee food is attachable to a feeder pipe 26 of the bee feeder 20. The feed jar 24 is preferably attached to the feeder piper 26 when the bee feeder 20 is rotated into the off position. FIG. 3B shows the bee feeder 20 after the feed jar 24 has been attached to the feeder pipe 26, whereby the bee feeder 20 is in the off position. FIG. 3C shows the bee feeder 20 with the feed jar 24 rotated into the on position for feeding the bees located inside the bee house 10.

Referring to FIG. 4A, in one embodiment, the bee feeder 20 preferably includes the feed jar 24 attached to the feeder pipe 26. The feeder pipe 26 has a plurality of feeder holes 28 extending along the length thereof for feeding bees located inside the bee housing. The bee feeder desirably has a frame 30, a feeder pipe housing 32 that supports the feeder pipe 26 and that enables rotation of the feeder pipe 26 about its longitudinal axis (between the on and off positions) relative to the frame 30, and a wire screen 34 or wire mesh/cloth that covers the top surface of the frame 30.

Figure 4B:
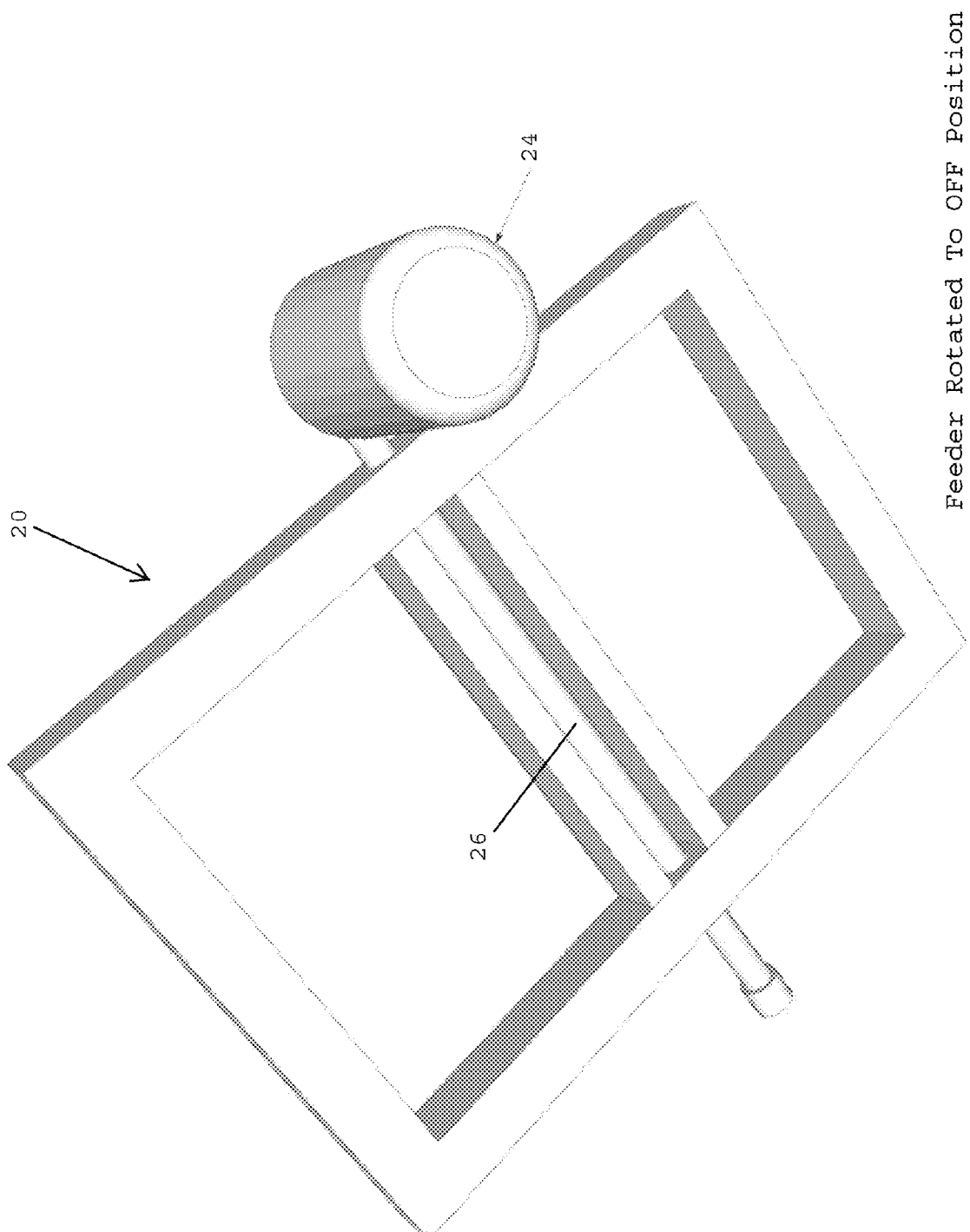
FIG. 4B shows a bottom perspective view of the bee feeder of FIG. 4A with the feed jar rotated into an off position.

In the on position shown in FIG. 4A, bees located inside the bee housing 10 (FIG. 1) may access the feeder holes 28 on the feeder pipe 26 for feeding. The feed jar 24 and the feeder pipe 26 may be rotated to the off position shown in FIG. 4B for turning off the bee feeder. The feed jar 24 may be changed with the bee feeder in the off position.

Figure 5:
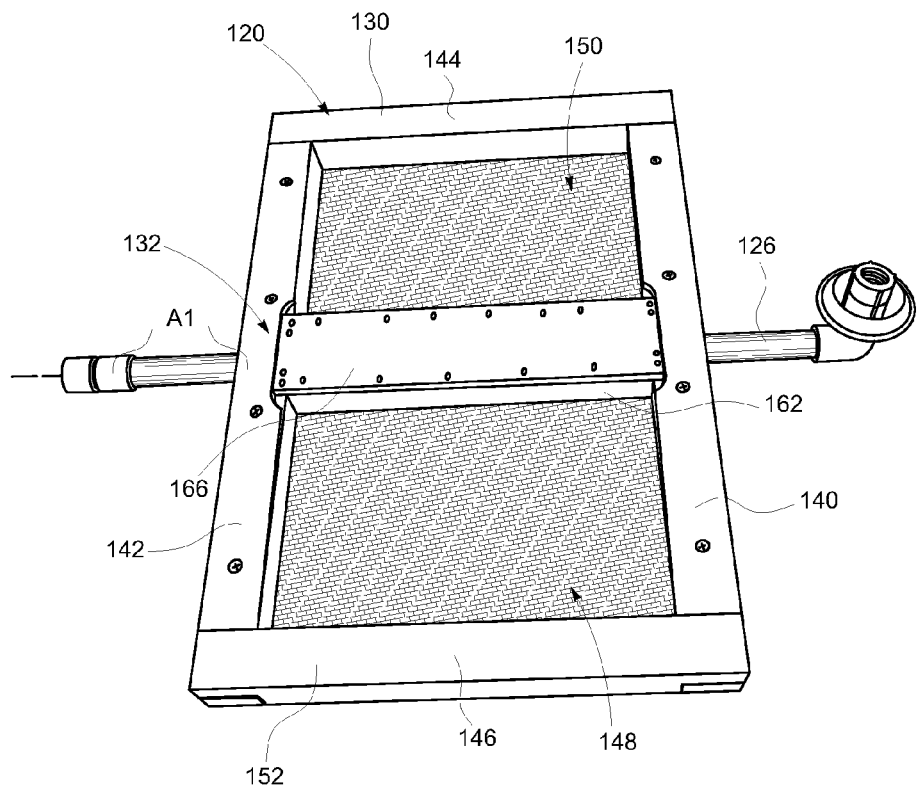
FIG. 5 shows a top perspective view of a bee feeder, in accordance with one embodiment of the present invention.
Figure 6:
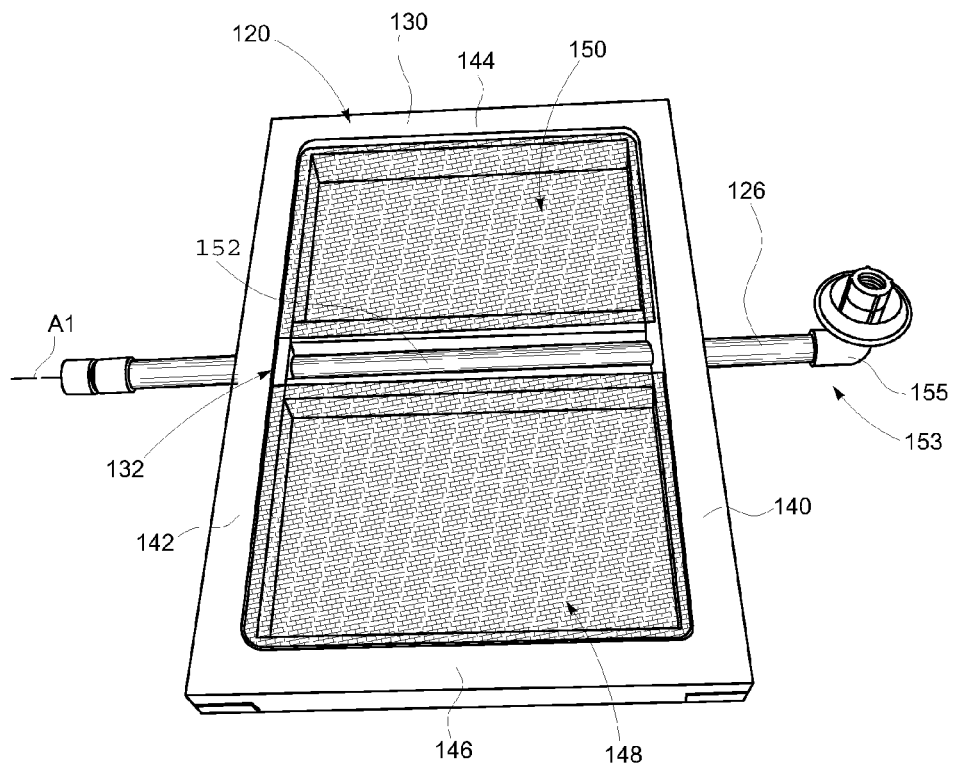
FIG. 6 shows a bottom perspective view of the bee feeder shown in FIG. 5.

Referring to FIGS. 5 and 6, in one embodiment, a bee feeder 120 preferably includes a frame 130 including a first side wall 140, a second side wall 142 that opposes the first side wall 140, a first end wall 144, and a second end wall 146. In one embodiment, the frame 130 has a square or rectangular shape. In one embodiment, the frame 130 may have a length of about one-two feet and more preferably about one foot, eight inches (1' 8"), and a width of about 0.5-1.5 feet and more preferably about 1 foot, one and three-quarter inches (1' 1 and ¾"). In one embodiment, the side walls 140 and 142, and the end walls 144 and 146 of the frame 130 desirably surround a central opening 148 of the frame that is covered by a divider 150. The divider 150 may be a screen or a mesh. In one embodiment, the divider is a screen 150 that is preferably secured to a bottom major face 154 of the frame 130 for dividing a top major face 152 (FIG. 5) of the frame from the bottom major face 154 of the frame. In one embodiment, the screen may be secured over the top major face of the frame or at any location that effectively divides the top major face from the bottom major face.

In one embodiment, the bee feeder 120 preferably includes a feeder pipe 126 having a distal pipe section 151 (FIG. 6) that extends through the central opening 148 of the frame 130 and a proximal pipe section 153 that extends outside the frame 130. A feed container may be secured to the proximal pipe section 153 for providing bee feed to the feeder pipe 126. In one embodiment, the proximal pipe section 153 preferably includes an elbow 155 having a bend. In one embodiment, the distal pipe section 151 preferably extends along a longitudinal axis $A_1$ that lies between the top and bottom major surfaces 152, 154 of the frame. In one embodiment, the proximal-most end of the elbow extends along an axis that is perpendicular to the longitudinal axis $A_1$ of the distal pipe section 151.

In one embodiment, the opposing first and second side walls 140, 142 of the frame 130 having aligned openings that receive the distal pipe section 151. The distal pipe section 151 is preferably rotatable within the aligned openings about the longitudinal axis $A_1$ and relative to the frame 130. In one embodiment, the aligned openings in the first and second side walls 140, 142 are sufficiently large relative to the outer diameter of the distal pipe section 151 so as to allow the distal pipe section to rotate within the aligned openings and about the longitudinal axis $A_1$ of the distal pipe section.

Figure 7A:
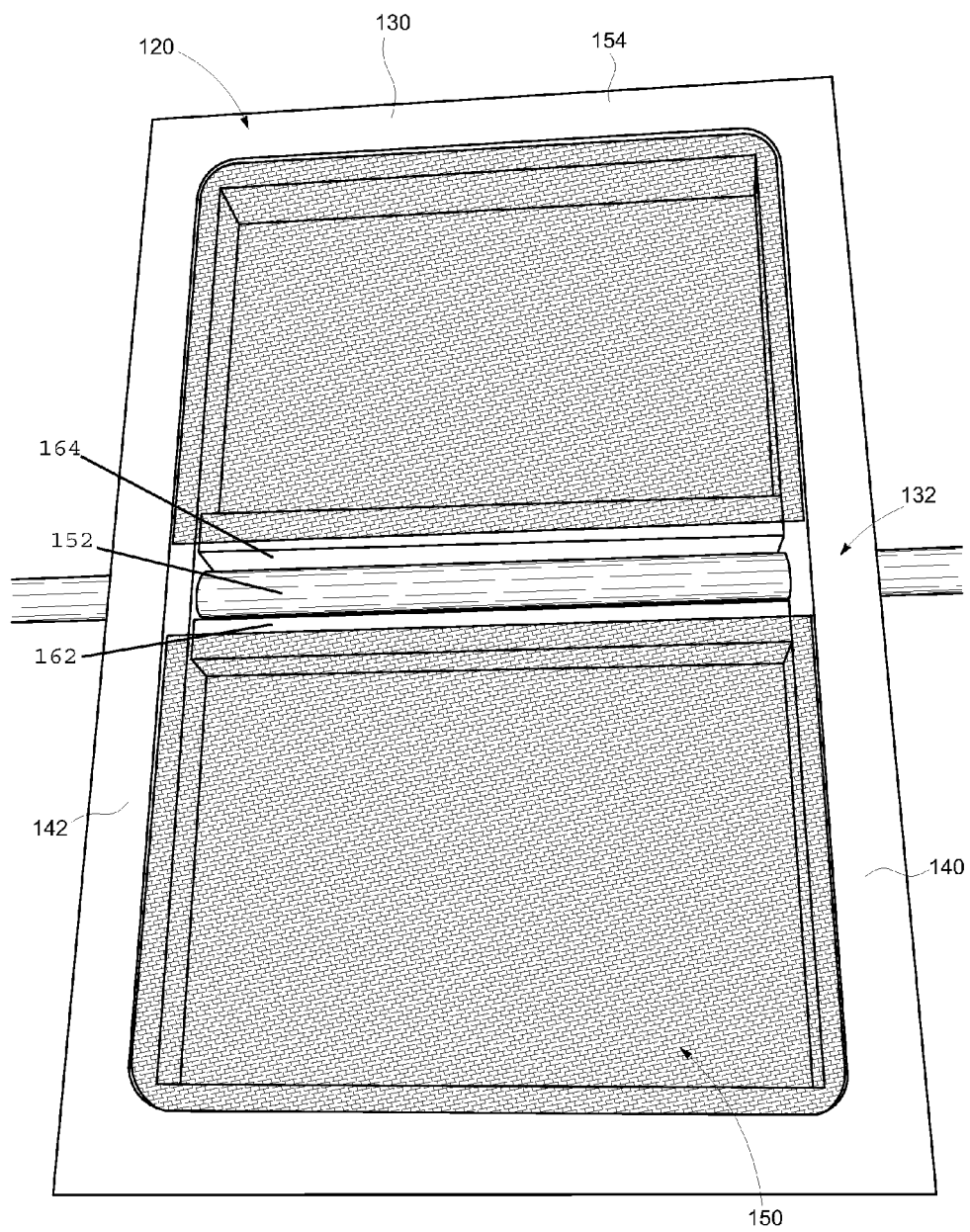
FIG. 7A shows a magnified view of the bottom of the bee feeder shown in FIG. 6.
Figure 7B:
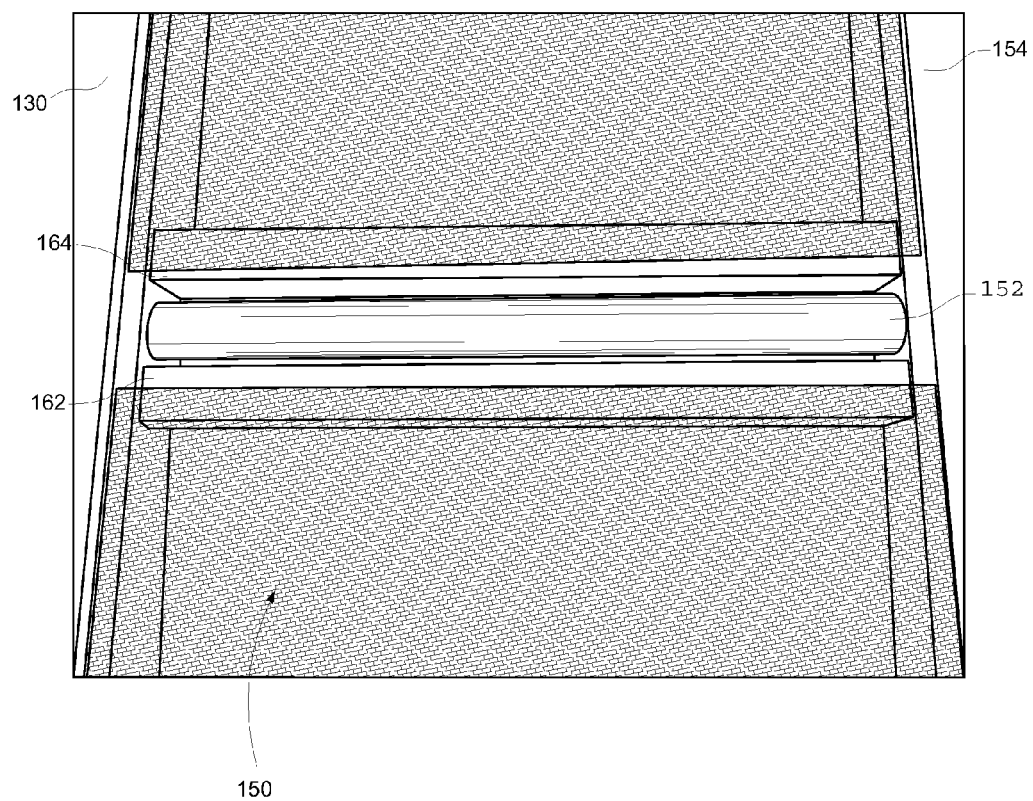
FIG. 7B shows another magnified view of the bottom of the bee feeder shown in FIG. 6.

Referring to FIGS. 7A and 7B, in one embodiment, the bee feeder 120 preferably includes a feeder pipe housing that surrounds three sides of the distal section 151 of the feeder pipe 126. In one embodiment, the feeder pipe housing preferably includes a first slat 162 that extends between the first and second side walls 140, 142 of the frame 130, and a second slat 164 that extends between the first and second side walls 140, 142 of the frame 130. The first and second slats 162, 164 preferably strengthen the frame 130 and cover/protect opposite sides of the distal section 152 of the feeder pipe 126. Referring to FIGS. 5, 7A and 7B, in one embodiment, the feeder pipe housing also desirably includes a top slat 166 (FIG. 5) that extends between upper ends of the first and second slats 162, 164. The top slat 166 preferably covers the top side of the distal section 151 of the feed pipe 126. In one embodiment, the feeder pipe housing preferably covers the top and sides of the distal pipe section 151 while not covering the bottom of the distal pipe section. As described above, the distal pipe section preferably includes a plurality of openings formed therein that are spaced from one another and that extend along the length of the distal pipe section. Bee feed directed into the distal pipe section 151 preferably drips from the holes when the distal pipe section is rotated into an ON position.

Referring to FIGS. 7A and 7B, in one embodiment, the screen 150 is secured to the bottom major face 154 of the frame 130. In one embodiment, the screen 150 preferably has a first section with an inner edge that is secured to the bottom surface of the first slat 162 of the feeder pipe housing 142 and a second section with an inner edge that is secured to the bottom surface of the second slat 164. In one embodiment, the screen 150 and the feeder pipe housing 132 divide the distal pipe section 151 and the bottom side of the frame 130 from the top side of the frame. In one embodiment, the screen 150 desirably functions as a divider to block bees from passing from an underside of the frame to a top side of the frame, which may prevent the bees from moving between different levels of a bee house 10 (FIG. 1).

The inventive bee feeders and bee feeder systems disclosed herein provide a number of benefits including that the home colony of bees has direct access to the syrup deep inside the hive; bees do not have to break cluster or be flying to utilize the feeder; foreign or robber bees do not have quick, easy access to the syrup; there is little or no chance of drowning bees when using the feeder; refilling can be done without suiting up, entering the hive, or disturbing the bees; and monitoring of the feeder is done from outside the hive; any mess is kept outside the hive.

Other benefits include that the inventive bee feeder disclosed herein allows for hive inspection without spilling syrup or wasting feed; the system can accommodate both a quart or a half-gallon of syrup at a time, depending on the needs of each hive; syrup can be removed on very cold days, and then re-installed easily when weather or conditions are favorable for feeding; and the system puts a limited amount of excess moisture into the hive. In contrast to plastic pail feeders that tend to squeeze out syrup with temperature fluctuations, the inventive bee feeder disclosed herein is stable and can be easily removed when temperatures plummet and feed is not needed.

Additional benefits include adaptability so that the feeder stage with the feeder pipe that provides the bees access to the feed may be placed inside the hive wherever it is most needed; and no extra equipment is required, such as additional hive boxes, floats, ladders, etc.

The bee feeder and bee feeder systems disclosed herein may be incorporated into a wide variety of bee hives having various dimensions and sizes including but not limited to Langstroth bee hives, Top-Bar bee hives, Warre bee hives, Nuc style bee hives, etc. In one embodiment of the present invention, the bee feeder is desirably installed into a Langstroth style hive. The bee feeder and bee feeder systems disclosed herein have scalability, however, and the components may be modified to fit a Nuc box, or a hive having different dimensions.

In the spring, when individuals are first starting bee colonies or buying packages of bees, the bee hive may initially have only one chamber or super, and one or more additional chambers or supers may be added, as needed. The bee feeder and be feeder systems disclosed herein may be used in a hive having only one chamber or super, or used in hives having two or more chambers or supers. In one embodiment, a bee feeder as disclosed herein may be used with only one chamber or super, whereby the bee feeder is placed above the bee chamber or super and below the inner cover and top cover/roof.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A bee feeder system comprising:
   a frame having a top major surface and a bottom major surface, said frame surrounding a central opening that extends from said top major surface to said bottom major surface;
   a feeder pipe extending across said central opening of said frame, said feeder pipe having a distal section that includes feeder holes formed on one side of said feeder pipe;
   said feeder pipe having a proximal section that extends outside said frame;
   a feed container attachable to said proximal section of said feeder pipe for supplying feed to said feeder pipe, wherein said feeder pipe is rotatable relative to said frame for moving between an on position in which said feeder holes face toward said bottom major face of said frame and an off position in which said feeder holes face toward said top major surface of said frame.

2. The bee feeder system as claimed in claim 1, wherein said proximal section of said feeder pipe has an elbow, and wherein said feed container is attached to a proximal end of said elbow.

3. The bee feeder system as claimed in claim 2, further comprising a support flange extending outwardly from said proximal end of said elbow for supporting said feed container when said feeder pipe is in the on position.

4. The bee feeder as claimed in claim 2, wherein said proximal end of said elbow has threads that engage opposing threads on said feed container.

5. The bee feeder as claimed in claim 1, wherein said distal section of said feeder pipe extends along a longitudinal axis, and wherein said feeder holes comprise a plurality of holes formed in the one side of said feeder pipe that are spaced from one another along a longitudinal axis of said distal section of said feeder pipe.

6. The bee feeder as claimed in claim 5, further comprising:
a first opening formed in a first side wall of said frame;
a second opening formed in a second side wall of said frame that opposes said first side wall, wherein said first and second openings are aligned with one another;
said distal section of said feeder pipe passing through said first and second aligned openings, wherein said distal section of said feeder pipe is free to rotate about the longitudinal axis and relative to said first and second aligned openings formed in said opposing first and second side walls.

7. The bee feeder as claimed in claim 6, further comprising a feeder pipe housing that surrounds at least two sides of said distal section of said feeder pipe, said feeder pipe housing including
a first slat located on a first side of said distal section of said feeder pipe and extending between said opposing first and second side walls of said frame;
a second slat located on a second side of said distal section of said feeder pipe and extending between said opposing first and second side walls of said frame.

8. The bee feeder as claimed in claim 7, said feeder pipe housing further comprising:
a top slat extending between upper ends of said first and second slats for covering a top side of said distal section of said feeder pipe.

9. The bee feeder as claimed in claim 8, wherein said top slat of said feeder pipe housing lies in a plane that is parallel with said top major surface of said frame.

10. The bee feeder as claimed in 1, wherein said feed container is inverted and is located above said distal section of said feeder pipe when said feeder pipe is in the on position and said feed container upright and is located below said distal section of said feeder pipe when said feeder pipe is in the off position.

11. The bee feeder as claimed in claim 1, wherein said distal section of said feeder pipe lies between said top and bottom major surfaces of said frame.

12. The bee feeder as claimed in claim 1, further comprising a divider covering said central opening of said frame for separating said top major surface of said frame from said bottom major surface of said frame.

13. The bee feeder as claimed in claim 12, wherein said divider is selected from the group consisting of screens and meshes.

14. A bee feeder system comprising:
a bee house having a plurality of levels stacked atop one another;
one of said levels of said bee house including a bee feeder, said bee feeder including
a frame having a top major surface and a bottom major surface, said frame surrounding a central opening that extends from said top major surface to said bottom major surface,
a feeder pipe extending across said central opening of said frame, said feeder pipe having a distal section that extends along a longitudinal axis and that includes feeder holes formed in said feeder pipe;
a divider covering said central opening for separating said top major surface of said frame from said bottom major surface of said frame and said distal section of said feeder pipe;
said feeder pipe having a proximal section that extends outside said frame;
a feed container attachable to said proximal section of said feeder pipe for supplying feed to said distal section of said feeder pipe, wherein said feeder pipe is rotatable relative to said frame for moving between an on position in which said feeder holes face toward said bottom major surface of said frame and an off position in which said feeder holes face toward said top major surface of said frame.

15. The bee feeder system as claimed in claim 14, wherein said divider is selected from the group consisting of screens and meshes.

16. The bee feeder as claimed in 14, wherein said feed container is located above said distal section of said feeder pipe when said feeder pipe is in the on position and said feed container is located below said distal section of said feeder pipe when said feeder pipe is in the off position.

17. The bee feeder system as claimed in claim 14, wherein said proximal section of said feeder pipe has an elbow, and wherein said feed container is attached to a proximal end of said elbow, said system further comprising a support flange extending outwardly from said proximal end of said elbow for supporting said feed container when said feeder pipe is in the on position.

18. The bee feeder system as claimed in claim 14, wherein said feeder holes comprise a plurality of holes formed in said distal section of said feeder pipe that are spaced from one another along the longitudinal axis of said distal section of said feeder pipe.

19. The bee feeder system as claimed in claim 14, wherein said divider further comprises:
a feeder pipe housing that surrounds at least two sides of said distal section of said feeder pipe, said feeder pipe housing including
a first slat located on a first side of said distal section of said feeder pipe and extending between opposing first and second walls of said frame,
a second slat located on a second side of said distal section of said feeder pipe and extending between said opposing first and second walls of said frame, and
a top slat extending between upper ends of said first and second slats and said opposing first and second walls of said frame for covering a top side of said distal section of said feeder pipe, wherein said top slat of said feeder pipe housing lies in a plane that is parallel with said top major surface of said frame.

20. The bee feeder system as claimed in claim 14, wherein said bee feeder is stackable at any of said levels of said bee house.

* * * * *